Oct. 14, 1952   J. C. CURTIS   2,613,647
ROCK DRILL
Filed Sept. 8, 1947
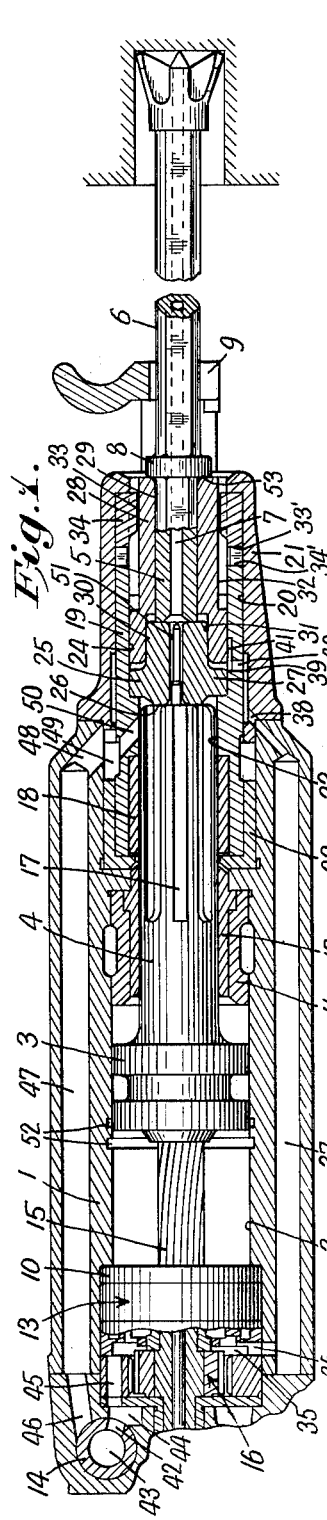
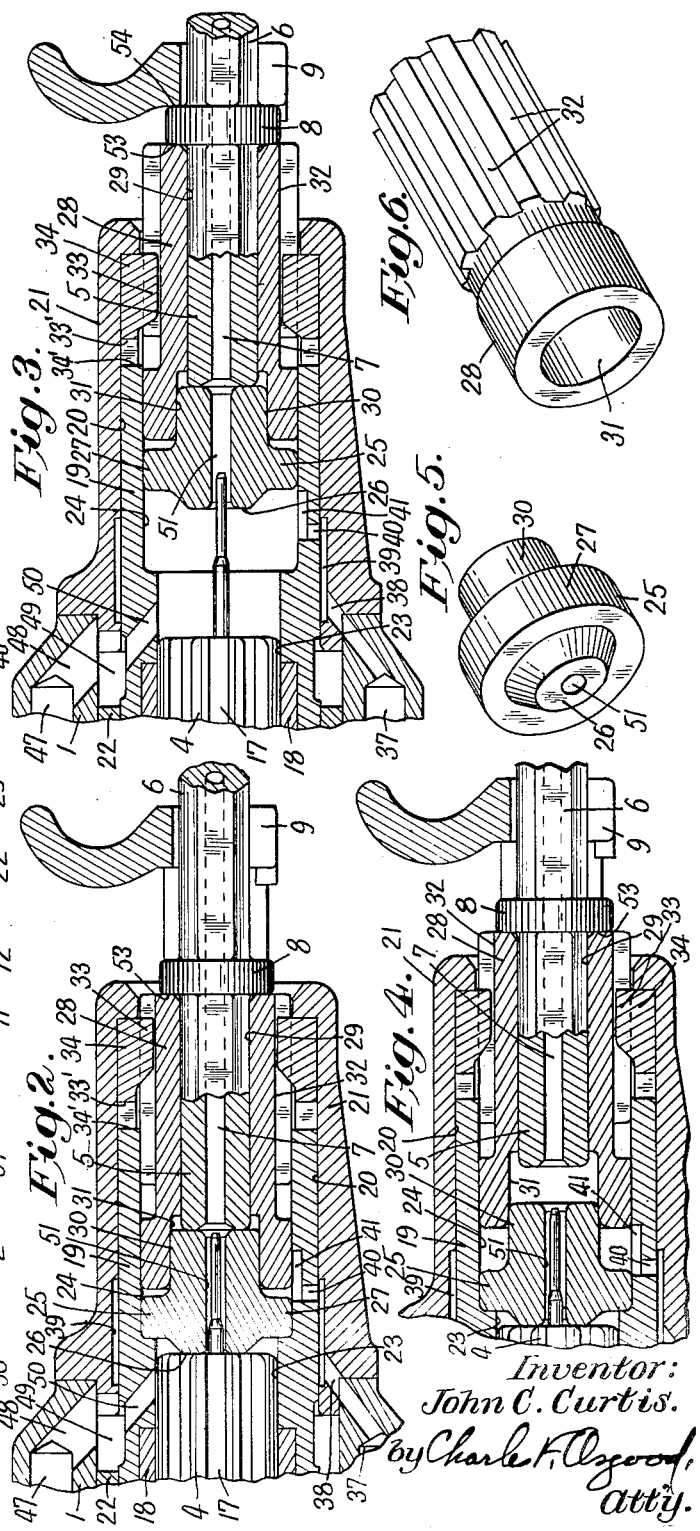
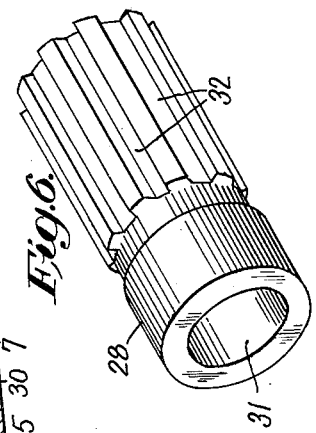
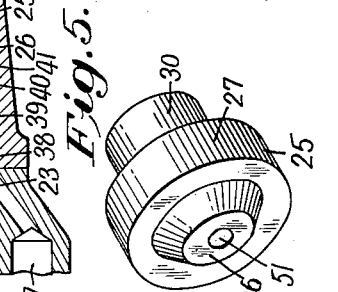
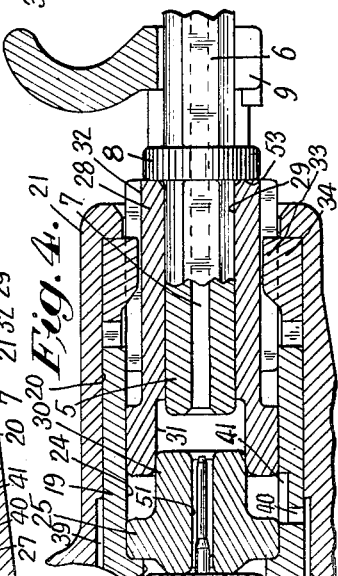
Inventor:
John C. Curtis.
By Charles F. Osgood,
atty.

Patented Oct. 14, 1952

2,613,647

UNITED STATES PATENT OFFICE 2,613,647

ROCK DRILL

John C. Curtis, Claremont, N. H., assignor to Joy Manufacturing Company, a corporation of Pennsylvania Application September 8, 1947, Serial No. 772,858

14 Claims. (Cl. 121—32)

This invention relates to rock drills and more particularly to improvements in the mechanism for supporting and for imparting impact blows to the drill steel of a hammer rock drill.

In conventional hammer rock drills, there is a chuck including a chuck bushing which receives and supports the shank of the drill steel, and such chuck bushing is usually held against axial movement in the drill chuck so that the steel shank reciprocates relative to the bushing during operation of the drill, resulting in considerable wear of the parts. In certain types of rock drills, the impact blows of the hammer piston are transmitted to the steel shank through a striking block or tappet which is mounted to reciprocate relative to the chuck bushing which is held against relative axial movement. When the steel shank moves forwardly relative to the chuck bushing, for instance, during soft drilling or during the hole blowing operation, there is considerable leakage of pressure fluid through the chuck bushing past the steel shank, resulting in loss of efficiency. Also, the tappet or striking block must move forwardly when the steel shank has moved forwardly out of the range of action of the hammer piston to prevent the latter from striking against the tappet and driving the latter forwardly against the chuck bushing, and in such drills, no means other than the steel shank is present to move the tappet back into its rearmost effective position. In order to provide for adequate forward movement of the tappet to prevent driving of the tappet against the bushing, the bushing must be relatively short in length. Also, in such drills, there is no guiding relation between the tappet and the chuck bushing for maintaining the same in proper alignment.

The present invention, in a preferred embodiment, contemplates improvements over such known rock drills as have been referred to, in that the chuck bushing is mounted for axial movement in the drill chuck and the tappet or striking block is associated with the bushing in a novel manner. By mounting the bushing for axial movement so that it may reciprocate with the steel shank during the drilling operation, not only are wear between the shank and bushing and fluid leakage substantially reduced, but also the tappet is free to move forwardly with the chuck bushing while in guiding relation therewith so that it may assume a position out of the reach of the piston when the drill steel shank is moved forwardly in the chuck, thereby to prevent driving of the tappet against the bushing and permitting a bushing of substantially greater length to be employed. By guiding the tappet in the bushing, improved alignment of the parts is attained. During the hole blowing operation, that is, when the drill steel shank is in its forward position, the pressure fluid acting on the rear surface of the tappet serves to hold the tappet and bushing forwardly with the drill steel collar against the retainer yoke of the drill and with the front end of the bushing held tightly against the steel collar so that substantial leakage of pressure fluid through the bushing is prevented. Also, in a preferred embodiment, pressure fluid may be admitted to the chuck between the tappet and chuck bushing so that the tappet is normally held rearwardly in an effective position while the chuck bushing is held forwardly against the steel collar. During the hole blowing operation, the flow of pressure fluid between the tappet and bushing may be cut off, but when normal drilling is resumed, the pressure fluid acting on the tappet urges the latter toward its rearmost effective position. Upon initiation of the hole blowing operation, the tappet, bushing and steel shank quickly move outwardly in the drill chuck out of reach of the hammer piston. By mounting the chuck bushing for axial movement, the bushing may be made relatively long while preventing the hammer piston from driving the tappet forwardly against the bushing when the steel shank is in its forward position.

An object of the present invention is to provide an improved steel receiving and supporting chuck and tappet arrangement for a hammer rock drill. Another object is to provide an improved tappet or striking block arrangement wherein the tappet or striking block is normally urged rearwardly under the action of pressure fluid. Still another object is to provide an improved tappet which has guided engagement with the chuck bushing which receives and supports the shank of the drill steel whereby improved alignment between the parts is attained. Yet another object is to provide an improved chuck bushing which is mounted for limited axial movement within the drill chuck and with which an improved tappet is associated, and means for supplying pressure fluid between the tappet and chuck bushing normally to urge the same apart. A still further object is to provide an improved tappet and sliding chuck bushing arrangement wherein, during the hole blowing operation, pressure fluid acting on the tappet urges the latter and the chuck bushing in a forward direction. Still another object is to provide an improved axially movable chuck bushing which is normally urged forwardly by pressure fluid toward a position wherein the bushing rests against the collar of a drill steel which has its shank supported in the chuck bushing. A still further object is to provide an improved tappet for transmitting the impact blows of the hammer piston to the shank of the drill steel and having a forward pressure area normally subjected to the action of pressure fluid for urging the tappet toward its rearward effective position. Still another object is to provide an improved tappet and sliding chuck bushing arrangement wherein the tappet and chuck bushing are maintained, during the hole blowing operation, in a forward position out of the range of action of the hammer piston, thereby to prevent the hammer piston from driving the tappet forwardly against the chuck bushing. A still further object is to provide improved means for holding the chuck bushing forwardly against the steel collar so that substantial leakage of pressure fluid through the bushing past the steel shank is prevented. Another object is to provide an improved tappet and sliding chuck bushing arrangement wherein the tappet and chuck bushing are held forwardly in the drill chuck during the hole blowing operation, with the bushing abutting the steel collar and the steel collar abutting the front retainer yoke of the drill. A still further object is to provide an improved tappet and chuck bushing arrangement wherein the tappet is guided within the chuck bushing so that improved alignment between the parts is attained. These and other objects and advantages of the invention will, however, hereinafter more fully appear.

In the accompanying drawing there is shown for purposes of illustration one form which the invention may assume in practice.

In this drawing:

Fig. 1 is a longitudinal vertical sectional view through a hammer rock drill, in which an illustrative form of the invention is embodied.

Fig. 2 is an enlarged sectional view taken on the plane of Fig. 1, showing the improved tappet and chuck bushing structure, with the tappet and bushing in their rearmost effective position.

Fig. 3 is a sectional view similar to Fig. 2, showing the tappet and chuck bushing in their outermost position, with the steel collar abutting the yoke of the drill steel retainer.

Fig. 4 is a sectional view, similar to Fig. 2, showing the chuck bushing in a forward position which it assumes during soft drilling.

Fig. 5 is a perspective view of the tappet.

Fig. 6 is a perspective view of the chuck bushing.

In this illustrative embodiment of the invention there is shown a hammer rock drill comprising a motor cylinder 1 having a bore 2 containing a reciprocatory hammer piston 3. The hammer piston has a forward reduced cylindrical extension or striking bar 4 for delivering impact blows, through an improved tappet structure to be later described, to the polygonal shank 5 of a conventional drill steel 6. The drill steel has an axial bore 7 and a usual collar 8 which is engageable with the yoke of a conventional drill steel retainer 9 when the drill steel is in its forward position, as for example, when the drill is being retracted from the work or during hole blowing. The cylinder has a rear head 10 and a front buffer ring 11, the latter supporting a bearing sleeve 12 in which the piston striking bar 4 is reciprocably guided. A conventional automatic fluid distributing valve mechanism, generally designated 13 (Fig. 1), controls the flow of pressure fluid from a throttle valve 14 through conventional fluid conducting passages to the opposite ends of the cylinder bore to effect reciprocation of the hammer piston, and the cylinder has a usual piston-controlled exhaust, all in the manner well known to those skilled in the art. This automatic valve mechanism and the associated fluid conducting and exhaust passages may be generally similar to those described in my Patent No. 2,224,859, dated December 17, 1940.

As is usual in rock drills of the type disclosed, the drill steel 6 is intermittently rotated by the hammer piston as the latter reciprocates to effect percussive actuation of the drill steel, and the mechanism for accomplishing this comprises a spirally grooved rifle bar 15 which is automatically held against rotation in one direction by a ratchet and pawl device, generally designated 16 (Fig. 1) and which is free to rotate in the opposite direction, in the manner also described in the patent above referred to. The rifle bar has sliding interlocking engagement with the spiral lugs of a usual rifle nut secured within the hammer piston. Thus as the piston moves forwardly to strike a blow on the steel shank, the pawls of the ratchet and pawl device slip relative to the teeth of the ratchet or permit free rotation of the rifle bar so that the piston moves freely forwardly to strike an unimpeded blow. Upon reversal of the hammer piston, the rifle bar is automatically held against rotation by the pawls engaging the teeth of the ratchet so that as the piston moves rearwardly, it is rotated by the spiral lugs of the rifle nut engaging the spiral grooves of the then stationary rifle bar. This rotative movement of the piston is transmitted to the drill steel through straight grooves 17 on the piston striking bar coacting with the straight lugs of a usual chuck nut 18 secured to a rotatable chuck sleeve 19. The chuck sleeve is rotatably mounted at its forward portion in a bore 20 of a front chuck housing 21 suitably secured to the front end of the motor cylinder, with its rearward portion journaled within a bearing sleeve 22 supported within a front bore in the motor cylinder. The chuck sleeve has a bore 23 which receives the forward end of the piston striking bar in the manner shown.

Now referring to the improved tappet and chuck bushing arrangement, it will be observed that reciprocably mounted in an enlarged forward axial bore 24 in the rotatable chuck sleeve 19 is a tappet or striking block 25 having a rearward impact surface 26 adapted to receive the impact blows of the hammer piston 3. Arranged in the chuck sleeve bore 24 in advance of the cylindrical body 27 of the tappet is a reciprocable chuck bushing 28 having a cylindrical body slidingly engaging, at its exterior periphery, the walls of the bore 24. This chuck bushing has an axial opening 29 of polygonal cross section which receives the polygonal shank of the drill steel, and the steel shank and bushing rotate together. The tappet 25 has a reduced cylindric portion 30 projecting forwardly from its body 27 and slidingly received in an enlarged rearward axial bore 31 in the chuck bushing so that the tappet is at all times held in proper axial alignment with the chuck bushing. The rear end of the steel shank projects rearwardly into the bore 31 of the chuck bushing in a position to receive the impact blows of the hammer piston transmitted thereto through the tappet 25. By the provision of the sliding mounting for the chuck bushing, the bushing body can be of greater length than that of a conventional non-reciprocable bushing, thereby affording larger bearing surfaces in the chuck sleeve bore. Since the tappet and chuck bushing may slide freely outwardly within the chuck sleeve when the steel shank is moved outwardly in the drill chuck, the possibility of the tappet being driven forwardly by the piston against the bushing is avoided. On the outer periphery of the bushing body are longitudinal splineways 32 which engage splines or keys 33 on a driver sleeve 34, the latter having clutch jaws 33' interlocked with mating clutch jaws 34' on the front end of the rotatable chuck sleeve 19 so that the sleeves 19 and 34 rotate together. The particular structure of the reciprocable chuck bushing and its driver sleeve may be generally similar to that disclosed in my copending application Serial No. 667,383, filed May 4, 1946.

In accordance with this invention, passage means are provided for supplying pressure fluid to the chuck sleeve bore intermediate the body of the tappet and the rear end of the sliding chuck bushing and for supplying a large quantity of pressure fluid through the tappet to the bottom of the drill hole to blow the hole. Leading from a chamber 35, through which pressure fluid flows from the throttle valve 14 to the automatic fluid distributing valve mechanism 13, is a port 36 communicating with a passage 37 extending longitudinally of the motor cylinder, and the forward end of the passage 37 is connected by a passage 38 with a recess 39 formed in the walls of the chuck housing 21. A port 40 in the rotatable chuck sleeve 19 connects the recess 39 with the bore 24 of the rotatable chuck sleeve 19. A longitudinal slot or groove 41 in the walls of the bore 24 communicates with the port 40. When the tappet 25 and chuck bushing 28 have moved rearwardly toward their rearward position shown in Figs. 1 and 2, pressure fluid may flow through the port 40 and slot 41 to the bore 24 between the forward surface of the tappet body and the rear end of the chuck bushing so that the tappet is urged rearwardly and the chuck bushing is urged forwardly, by pressure fluid. The throttle valve 14 has a port 42 which connects the axial supply chamber 43 in the valve with a chamber 44 which in turn communicates through a passage 45 with the chamber 35.

The hole blowing passage means comprises a passage 46 communicating with a longitudinal passage 47 in the cylinder wall, and the forward end of the passage 47 communicates through a port 48 with an annular recess 49 surrounding the rotatable chuck sleeve 19. A passage 50 in the chuck sleeve connects the recess 49 with the chuck sleeve bore 23. When the throttle valve 14 is turned to bring the port 42 into communication with the passage 46, flow of pressure fluid to the chamber 44 is cut off and pressure fluid may flow through passage 47, port 48, recess 49 and port 50 to the chuck sleeve bore 23, and thence through the bore 24 and an axial passage 51 in the tappet and axial bore 7 in the drill steel to the bottom of the drill hole to clear away the cuttings from the drill bit. The pressure fluid flowing continuously to the bores 23 and 24 during the hole blowing operation acts on the front end of the piston striking bar 4 to retract the piston, in a well known manner, substantially to the position shown in Fig. 3, with the piston head substantially closing the cylinder exhaust 52, and concurrently pressure fluid acts on the rear end of the tappet 25 to hold the latter and the chuck bushing 28 in their forward position, with the front end of the chuck bushing abutting at 53 against the collar 8 of the drill steel and with the steel collar held outwardly at 54 against the yoke of the drill steel retainer 9, as is also shown in Fig. 3.

During normal drilling, the throttle valve 14 is turned into the position shown in Fig. 1, with pressure fluid flowing through chamber 44, passage 45 and chamber 35 to the automatic valve mechanism 13, and pressure fluid is distributed by the latter to the opposite ends of the cylinder bore in a well known manner. During reciprocation of the hammer piston, pressure fluid may intermittently flow from the front end of the cylinder bore through the grooves 17 on the piston striking bar to the bores 23 and 24 and through the tappet bore 51 and steel bore 7 to the bottom of the drill hole to keep the drill hole clear of cuttings. The pressure fluid flowing through port 36, passages 37 and 38, recess 39, port 40 and groove 41 to the chuck sleeve bore 24 intermediate the forward surface of the tappet body and the rear surface of the chuck bushing serves to urge the tappet toward its rearward position shown in Fig. 2 and to urge the chuck bushing forwardly to hold its outer end in substantial sealing contact with the steel collar 8 so that substantial leakage of pressure fluid through the chuck bushing past the steel shank is prevented, thereby causing flow of pressure fluid in substantial quantity through the tappet bore 51 and steel bore 7 to the bottom of the hole. By the provision of the sliding mounting for the chuck bushing, the latter tends to reciprocate with the steel shank so that wear between the bushing and shank is substantially reduced, and the tappet projection 30, guided in the bore 31 of the chuck bushing, serves to maintain the tappet in proper alignment with the chuck bushing irrespective of the relative positions of the parts. In the event the drill bit of the drill steel penetrates a cavity in the work during drilling, or when the drill is retracted from the work, the steel collar 8 will move outwardly into contact with the yoke of the steel retainer 9 while the front end of the chuck bushing remains in substantial sealing contact with the collar, and since at that time the pressure fluid acting on the bushing moves the latter forwardly with the drill steel relative to the tappet, the possibility of the tappet being driven forwardly against the bushing by the hammer piston is avoided. As the tappet and chuck bushing slide forwardly in the drill chuck, the communication of the port 40 and groove 41 with the space between the tappet body and the rear end of the bushing is cut off and the parts are held in the position shown by pressure fluid in the bore 24 acting on the rear pressure area of the tappet. As above pointed out, when the tappet is in its rearward position either during normal drilling, as shown in Fig. 2, or during soft drilling, as shown in Fig. 4, it is so held by pressure fluid in the bore 24 acting on the front pressure area of the tappet body. During normal drilling or during soft drilling, the sliding chuck bushing is urged forwardly into sealing contact with the steel collar by pressure fluid in the bore 24 acting on the rear pressure area of the bushing. As the hammer piston reciprocates during drilling, the chuck sleeve 19 is intermittently rotated by the piston, and sleeve rotation is transmitted to the drill steel through the driver sleeve 34 which is clutched to the chuck sleeve and is splined to the chuck bushing.

As a result of this invention, an improved tappet and chuck bushing arrangement is provided wherein not only is substantial leakage of pressure fluid through the chuck bushing past the steel shank prevented, but also the piston blows are imparted to the steel shank in a more effective manner. By the provision of the improved arrangement of the tappet and chuck bushing, improved alignment between the parts is attained. By arranging the tappet and bushing in the manner disclosed and by supplying pressure fluid to the space between the tappet and chuck bushing, the tappet is normally urged by pressure fluid toward its rearward effective position while the chuck bushing is urged forwardly by pressure fluid into tight sealing engagement with the collar. By slidingly mounting the chuck bushing, it is possible to increase the length of the bushing body so that greater bearing surfaces are afforded, and since the tappet and chuck bushing slide outwardly with the steel during the hole blowing operation, the possibility of the tappet being driven forwardly by the piston against the chuck bushing is avoided. The improved tappet and chuck bushing structure is relatively simple in design and may be applied to a conventional rock drill with but relatively little modification. Other manners of use and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a rock drill, a tappet and chuck construction comprising a reciprocable tappet for transmitting impact blows to the shank of a reciprocable drill steel, and a reciprocable chuck bushing axially aligned with said tappet for receiving and reciprocably supporting the steel shank, said chuck embodying means for mounting said tappet and said bushing for free reciprocatory movement both relative to one another and in unison with respect to said mounting means, and said tappet and said chuck bushing having contacting portions in cooperating guiding relation for maintaining the same in axial alignment during such movements thereof, said tappet having a forwardly facing impact surface in adjacency to said cooperating guiding portions of said tappet and said bushing whereby said tappet is firmly guided by said bushing at the point of delivery of impact blows to the steel shank.

2. A rock drill, as set forth in claim 1, wherein said cooperating guiding portions of said tappet and said chuck bushing comprise a forwardly projecting cylindrical reduced portion on said tappet and a rearward axial bore in said chuck bushing for receiving and guiding said tappet-portion, the steel shank terminating at its rear end within said bushing-bore and said cylindrical tappet portion providing a forwardly facing impact surface adapted to strike against the rear end of the steel shank, and the point of impact of the tappet with said steel shank located within a transverse zone including the forward portion of said tappet portion and a portion of said guiding bore of said bushing whereby the parts are adequately guided at the point of impact.

3. In a rock drill, a tappet and chuck construction comprising a reciprocable tappet element for transmitting impact blows to the shank of a reciprocable drill steel, and a reciprocable chuck bushing element axially aligned with said tappet element for receiving and reciprocably supporting the steel shank, said tappet and chuck construction embodying means for mounting said tappet and bushing elements for free reciprocatory movement both in unison and relative to one another with respect to said mounting means, one of said elements having a projecting cylindrical reduced portion and said other element having an axial bore for receiving and guiding said cylindrical portion, the steel shank terminating at its rear end within said bore, and said tappet element having a forwardly facing impact surface adapted to strike against the rear end of the steel shank in a transverse zone including portions of said cylindrical portion and said bore whereby said tappet element is firmly guided by said bushing element at its point of impact.

4. In a rock drill, the combination comprising a chuck sleeve having a bore, a tappet reciprocable in said bore for transmitting impact blows to the shank of a reciprocable drill steel, a chuck bushing reciprocable in said bore for receiving and reciprocably supporting the shank of the drill steel and normally freely reciprocable between two extreme axial positions and into any intermediate positions with respect to said sleeve, said tappet freely reciprocable between a rearward position and a forward position wherein its impact surface engages the rear end of the steel shank, said tappet when in its forward position in engagement with the steel shank moving in unison with said chuck bushing with respect to said sleeve, and control means operable at will for supplying pressure fluid to said sleeve-bore at the rear side of said tappet for moving said tappet forwardly into engagement with the steel shank and for moving said tappet and said bushing in unison forwardly in said bore when said tappet is engaged with the steel shank.

5. In a rock drill, the combination comprising a chuck sleeve having a bore, a tappet reciprocable in said bore for transmitting impact blows to the shank of a reciprocable drill steel, a chuck bushing reciprocable in said bore for receiving and reciprocably supporting the steel shank and normally freely reciprocable between two extreme axial positions and into any intermediate position with respect to said sleeve, said tappet being freely reciprocable between a rearward position and a forward position wherein its impact surface engages the rear end of the steel shank and said tappet and said bushing movable in unison axially in said sleeve bore, means for conducting pressure fluid to the space within said sleeve bore between said tappet and said bushing for yieldingly moving said tappet rearwardly and said bushing forwardly in said bore, and means for conducting pressure fluid to said bore at the rear side of said tappet for moving said tappet forwardly in said bore into engagement with the steel shank and for moving said tappet and said bushing forwardly in unison in said bore when said tappet is engaged with the steel shank, said tappet, when said tappet and said bushing are in a forward position in said bore, cutting off communication of said first mentioned fluid conducting means with said space between said tappet and said bushing.

6. In a rock drill, a tappet and chuck arrangement comprising a reciprocable tappet for transmitting impact blows to the shank of a reciprocable drill steel, and a reciprocable chuck bushing for receiving and reciprocably supporting the shank of the drill steel, said chuck embodying means for mounting said tappet and said chuck bushing for free axial reciprocation both in unison and relative to one another, said tappet reciprocable between a rearward position and a forward position wherein it engages the rear end of the steel shank and said chuck bushing freely reciprocable between two extreme axial positions and into any intermediate positions with respect to said mounting means, said bushing having a rearward axial bore into which the rear end of the steel shank projects and said tappet having a forward cylindrical striking portion slidingly received in said bushing bore, the rear end of the steel shank terminating within said bushing bore and said forward striking portion having a forwardly facing impact surface adapted to strike against the rear end of the steel shank whereby said tappet is firmly guided by said bushing at its point of impact with the steel shank.

7. In a rock drill, the combination comprising a chuck sleeve having a bore, a tappet reciprocable in said bore for transmitting impact blows to the shank of a reciprocable drill steel, a chuck bushing reciprocable in said bore for receiving and reciprocably supporting the steel shank, said tappet freely reciprocable within said bore between a rearward position and a forward position wherein it engages the rear end of the steel shank and said chuck bushing freely reciprocable between two extreme axial positions and into any intermediate positions with respect to said sleeve, said tappet when in engagement with the steel shank movable forwardly in unison with said chuck bushing in said sleeve bore, means for conducting pressure fluid to the space in said bore between said tappet and said bushing for yieldingly moving said tappet rearwardly in said bore, means for conducting pressure fluid to said bore at the rear side of said tappet to yieldingly move said tappet forwardly in said bore into engagement with the steel shank and to move said tappet and said bushing forwardly in unison in said bore when said tappet is engaged with the steel shank, said tappet, when said tappet and said bushing are in a forward position in said bore, cutting off communication of said first mentioned conducting means with said space between said tappet and said bushing, and operator-controllable control means for both of said conducting means for effecting fluid flow alternatively therethrough.

8. In a rock drill, a chuck mechanism for receiving and reciprocably supporting the shank of a reciprocable drill steel, a reciprocable tappet for transmitting impact blows to the steel shank, said tappet having opposed pressure areas, said chuck mechanism including means for mounting said tappet for free reciprocatory movement, and control means operable at will for alternatively effecting a continuous flow of pressure fluid to said opposed areas on said tappet for yieldingly moving said tappet either forwardly or rearwardly with respect to said mounting means.

9. In a rock drill, a drill chuck including a reciprocable chuck bushing for receiving and reciprocably supporting the shank of a reciprocable drill steel and having a rear pressure area, said chuck embodying means for mounting said bushing for free reciprocation between two extreme axial positions and into any intermediate positions with respect to said mounting means, means for conducting pressure fluid to said chuck to act on the rear pressure area of said bushing for yieldingly moving the latter forwardly with respect to said mounting means during normal drilling, means for conducting pressure fluid to said chuck to act on the rear pressure area of said bushing to move the latter forwardly into its extreme forward position, in advance of said normal drilling position, during a hole blowing operation, and control means for alternatively effecting a pressure fluid supply to said first and second mentioned conducting means whereby said bushing may be moved forwardly as aforesaid in said mounting means at will.

10. In a rock drill, a tappet and chuck construction comprising a reciprocable chuck bushing for receiving and supporting the shank of a drill steel, a reciprocable tappet alined with said bushing for transmitting impact blows to the steel shank, guiding means in which said bushing and tappet are guided, said bushing and tappet having mutual axial guided engagement and movable when in guided engagement axially relative to each other in said guiding means and said bushing and tappet cooperating with said guiding means to provide an annular sealed space therebetween in all positions of relative axial movement thereof, and means operable at will for effecting a continuous supply of pressure fluid to said annular space between said bushing and tappet for yieldingly urging the same apart.

11. In a rock drill, a tappet and chuck construction comprising a reciprocable chuck bushing element for receiving and supporting the shank of a drill steel, a tappet element alined with said bushing for transmitting impact blows to the steel shank, one of said elements having a bore receiving a cylindrical portion of said other element whereby said elements are guided for relative axial movement, guiding means within which said bushing and tappet elements are guided, said bushing and tappet elements cooperating with said guiding means to provide an annular sealed space therebetween, and means operable at will for effecting a continuous supply of pressure fluid to said annular space between said elements for yieldingly urging said elements apart.

12. In a rock drill, a tappet and chuck construction comprising a chuck sleeve having a bore, a chuck bushing for receiving and supporting a shank of a drill steel and reciprocable in said bore, a tappet reciprocable in said bore for transmitting impact blows to the steel shank, said bushing and tappet having cooperating telescopically arranged portions for guiding the same for relative axial movement, and said bushing and tappet cooperating with the walls of said sleeve bore to provide an annular sealed space therebetween, and means operable at will for effecting a continuous supply of pressure fluid to said annular space for yieldingly urging said bushing and tappet apart.

13. In a rock drill, a drill steel chuck comprising a rotatable chuck sleeve, a reciprocable chuck bushing for receiving and reciprocably supporting the shank of a reciprocable drill steel and relative to which the steel shank is free to slide, said bushing mounted in said sleeve for free sliding movement axially relative thereto between two extreme positions and into any intermediate position, a reciprocable tappet freely slidingly guided in said sleeve in axial alignment in said bushing for transmitting impact blows to the steel shank, means for slidingly interlocking said sleeve and bushing for rotation together in all axial positions of said bushing including said extreme positions and all intermediate positions while permitting free sliding movement of said bushing relative to said sleeve, said tappet slidable in said sleeve between its extreme rearward position and a forward position wherein said tappet engages the rear end of the steel shank and said tappet when in engagement with the steel shank moving forwardly in unison with said bushing relative to said sleeve, and control means operable at will for effecting a continuous supply of pressure fluid to the interior of said sleeve between said bushing and said tappet for moving said tappet rearwardly and for moving said bushing forwardly and to maintain said bushing in aforesaid forward position in said sleeve.

14. In a rock drill, the drill steel chuck comprising a rotatable chuck sleeve, a reciprocable chuck bushing for receiving and reciprocably supporting the shank of a reciprocable drill steel and relative to which the steel shank is free to slide, said bushing mounted in said sleeve for free sliding movement axially relative thereto between two extreme positions and into any intermediate position, a reciprocable tappet freely slidingly guided in said sleeve in axial alignment with said bushing for transmitting impact blows to the steel shank, said tappet slidable between an extreme rearward position and a forward position wherein it engages the rear end of the steel shank and slidable forwardly in unison with said bushing when engaged with said shank, means for slidingly interlocking said sleeve and said bushing for rotation together in the axial positions of said bushing including said extreme positions and all intermediate positions while permitting free sliding movement of said bushing relative to said sleeve, and operator controllable control means for effecting a continuous supply of pressure fluid to the interior of said sleeve rearwardly of said tappet for yieldingly moving the latter forwardly relative to said sleeve into engagement with the steel shank and for yieldingly moving said tappet and said bushing in a forward direction in unison relative to said sleeve and to maintain said bushing in its extreme forward position in said sleeve.

JOHN C. CURTIS.

REFERENCES CITED

The following references are of record in the file of this patent:

UNITED STATES PATENTS

| Number | Name | Date |
|---|---|---|
| 1,832,471 | Nell | Nov. 17, 1931 |
| 2,090,032 | Curtis | Aug. 17, 1937 |
| 2,251,224 | Curtis | July 29, 1941 |